Figure 1:
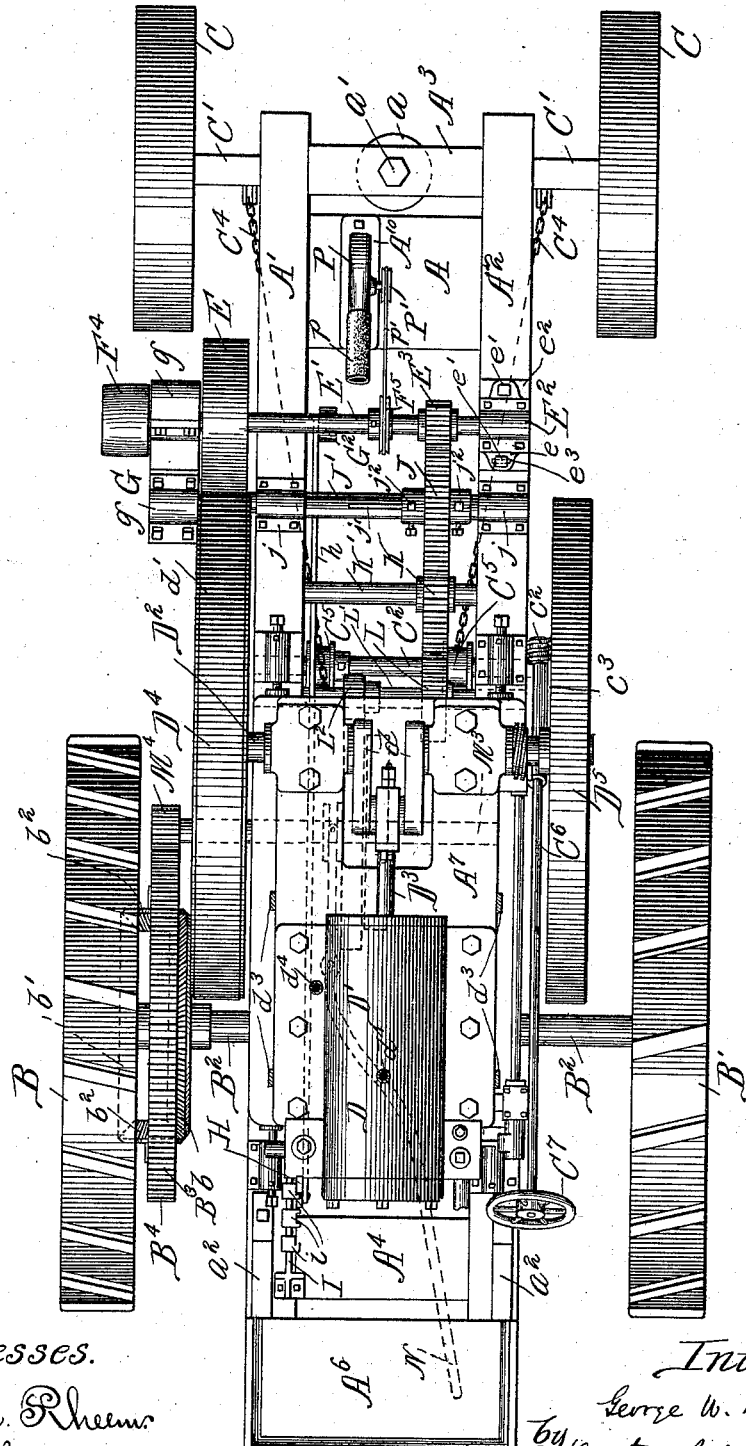

(No Model.) 3 Sheets—Sheet 1.

G. W. LEWIS.
MOTOR FOR TRACTION ENGINES.

No. 545,962. Patented Sept. 10, 1895.

Witnesses.
Wm. M. Rheem
Wm. F. Henning

Inventor.
George W. Lewis
By Dayton, Poole & Brown
Atty's

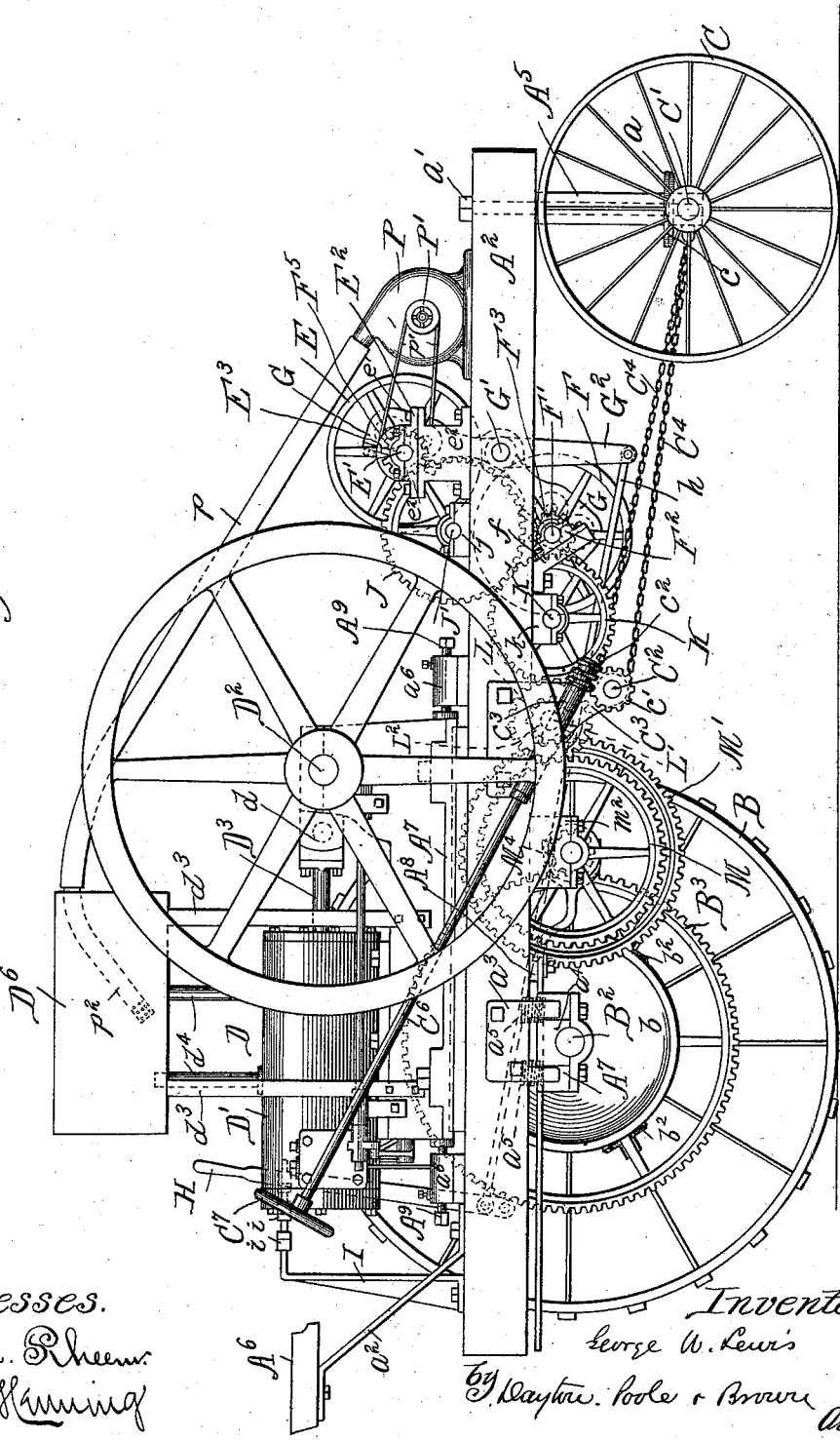

(No Model.)
G. W. LEWIS.
MOTOR FOR TRACTION ENGINES.
No. 545,962. Patented Sept. 10, 1895.
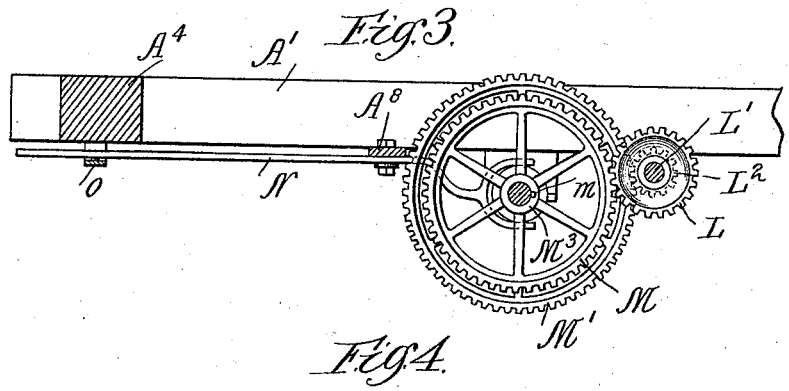
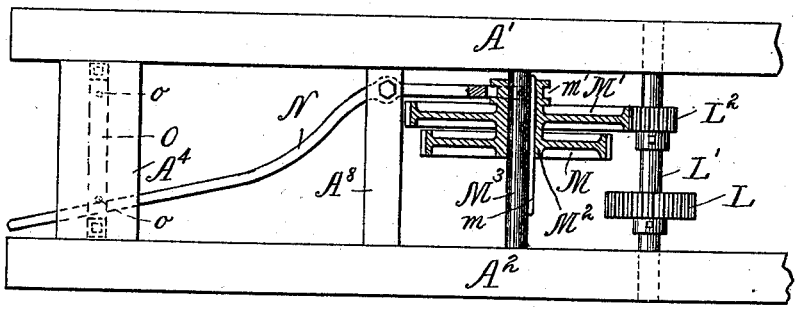
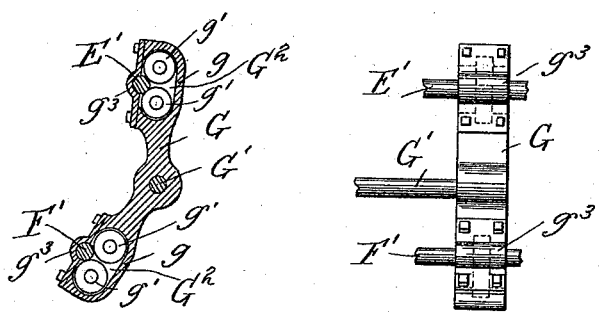
Witnesses.
Inventor.
George W. Lewis
by Dayton, Poole & Brown
Atty's

UNITED STATES PATENT OFFICE.

GEORGE W. LEWIS, OF CHICAGO, ILLINOIS.

MOTOR FOR TRACTION-ENGINES.

SPECIFICATION forming part of Letters Patent No. 545,962, dated September 10, 1895.

Application filed June 20, 1894. Serial No. 515,181. (No model.)

*To all whom it may concern:*

Be it known that I, GEORGE W. LEWIS, of Chicago, in the county of Cook and State of Illinois, have invented certain new and useful Improvements in Motors for Traction-Engines and the Like; and I do hereby declare that the following is a full, clear, and exact description thereof, reference being had to the accompanying drawings, and to the letters of reference marked thereon, which form a part of this specification.

This invention relates to improvements in traction-engines for agricultural and other purposes; and it consists in the matters hereinafter set forth, and particularly pointed out in the appended claims.

In the accompanying drawings, Figure 1 is a top plan view of a traction-engine embodying my improvements in one form. Fig. 2 is a side elevation thereof. Fig. 3 is a detail sectional elevation of the speed-changing gearing. Fig. 4 is a plan detail of the same. Fig. 5 is a sectional detail of the oscillatory bearing-support. Fig. 6 is a rear view thereof.

In said drawings, A designates the main frame of the vehicle, B B′ the main supporting and driving wheels thereof, and C C the front supporting and guiding wheels. As herein shown, said frame A comprises two longitudinal side beams A′ A², connected at their front and rear ends by cross-pieces A³ A⁴. From the center of the front cross-piece A³ a metallic standard A⁵ extends downwardly to the axle C′ of the steering-wheels, and is provided at its lower end with a circular plate $a$, resting on a similar plate $c$, located centrally upon the axle C′. A king-bolt $a'$, passing downward through the standard A⁵ and axle pivotally secures the latter to the frame.

C² designates a transverse shaft journaled in the lower ends of depending brackets C³, which are bolted to the side beams A′ A² about midway of the length thereof. Steering-chains C⁴ are securely fastened at one end to said shaft, or, as herein shown, to drums C⁵, rigidly mounted on said shaft, and have their other ends secured to the axle C′ near the outer ends thereof. One of the chains C⁴ is wound about the shaft C² in one direction and the other in the opposite direction, so that as said shaft is rotated one of the chairs is slackened and the other tightened, and the axle C′ is thereby turned on the king-bolt $a'$ to guide the vehicle in the one direction or the other, according to the direction in which the shaft C² is rotated. Said shaft is conveniently actuated, as herein shown, by a worm-wheel $c'$, which is rigidly secured to it at one end, and is engaged by a worm $c^2$ on the lower front end of a longitudinally-arranged shaft C⁶. The latter is journaled in a sleeve $c^3$ on the adjacent bearing-bracket C³, and extends upwardly and rearwardly therefrom. An engineer's seat A⁶ is in this instance provided at the rear of the frame A upon spring-bars $a^2$, bolted to the side beams A′ A², and the shaft C⁶ terminates at its upper rear end in a hand-wheel C⁷ within convenient reaching distance of said seat. By turning the hand-wheel C⁷ the engineer may therefore obviously guide the vehicle as desired. Near their rear ends the side beams A′ A² are supported upon the main driving-axle B² of the driving-wheels B B′ by means of journal-bearings A⁷ on the under side of the beams through which said axle B² passes. Said bearings in this instance each comprise an upper section $a^3$, which is bolted to the beam, and a separate lower section $a^4$, containing the bearing proper and adapted to slide vertically within the upper section $a^3$. Coiled springs $a^5$, inserted between the sections $a^3$ and $a^4$, afford a yielding cushion between the same and serve to partially relieve the frame A and the operative parts carried thereby from jolting and vibration.

D designates the actuating-motor, which is mounted upon a base-plate A⁷, extending across the tops of the beams A′ A² above the axle B². In the broad aspect of my invention said motor may be of any suitable type; but in this instance it is shown as an ordinary gas or vapor engine, and is provided at its rear end with a cylinder D′ and at its front end with a transverse crank-shaft D². The crank $d$ of the shaft D² is connected with the piston within the cylinder by a connecting-rod D³, and the shaft is provided at its ends with balance or driving pulleys D⁴ D⁵, which, as herein shown, are of large diameter and extend outside of the beams A′ A².

E and F designate two friction-pulleys, which are rigidly mounted upon transverse shafts E' and F', so that they both stand in the plane of one of the motor-pulleys—in this instance, the pulley $D^4$—with their peripheries in close proximity to the periphery of said pulley $D^4$. The ends of the shafts E' F' adjacent to the pulleys E F are journaled in bearings $g$ $g$, located at the upper and lower ends, respectively, of an oscillatory arm G. This arm is pivotally supported at a point between the bearings $g$ $g$ at its ends by being rigidly attached to the end of a transverse shaft G', which is journaled in suitable bearings on the machine-frame and extends outwardly beyond the beam A' far enough to support the arm G outside of the driving-pulleys. Said arm G is designed to be oscillated at will to throw either of the pulleys E or F into operative contact with the motor-pulley $D^4$, and to this end its supporting-shaft G' is in this instance provided with a downwardly-extending rigid radial arm $G^2$, which is connected by a link or rod $h$ with a reversing-lever H at the rear of the engine. As herein shown, the lever H is pivoted at its lower end $h'$ to the side beam A', and at its upper end is adapted to be engaged and held in either a forward, rearward, or intermediate position by projecting lugs $i$ $i$ on the upper horizontal arm of a standard I, which is bolted to the frame A. When the lever H is thrown forward, the upper friction-pulley E is forced into contact with the motor-pulley $D^4$ so as to revolve therewith. When the lever H is thrown back, the lower friction-pulley F is forced into contact with said motor-pulley, while the upper pulley E is moved backwardly out of contact therewith. When the lever H is placed in its intermediate position, both of the pulleys E and F are held free from said pulley $D^4$. The ends of the shafts E' F' opposite to the pulleys E F are journaled in bearings $E^2$ $F^2$, secured to the side beam $A^2$ in such manner as to permit of the slight oscillatory motion of the shafts E' F', resulting from the movement of the pulleys E and F into and out of contact with the pulley $D^4$. As herein shown, the bearing $E^2$ is made in the form of an ordinary bearing-box, the base-flange $e$ of which is secured by bolts $e'$ to the upper flange of a casting $e^2$, bolted to the top of the beam $A^2$. The bolt-aperture $e^3$ at one end of the base-flange $e$ is made of transversely elongated or slotted form, and permits the box to swing slightly about the opposite bolt $e'$ as a pivot when the arm G and shaft E' are oscillated. The bearing $F^2$ for the shaft F' is secured by similar means to the upper front face of a downwardly and forwardly inclined bracket $f$, bolted to the inner side of the beam $A^2$, the plane of the surface upon which the bearing rests and moves being thus arranged substantially radial to the main crank-shaft or parallel to the plane of the oscillatory movement of the shaft F'.

Operative connections are provided between the shafts E' and F' and the driving-wheels B and B' for causing the latter to rotate in either direction, as desired, accordingly as the pulley E or the pulley F is forced into contact with the motor-pulley $D^4$, such connections being in this instance, constructed as follows: $E^3$ and $F^3$ designate toothed gear-pinions keyed to the shafts E' and F', respectively, in a common plane between the side beams A' $A^2$. The pinion $E^3$ intermeshes with a toothed gear J, which is mounted on a shaft J', journaled in bearings $j$ $j$ on the side beams A' $A^2$. The pinion $F^3$ intermeshes with a toothed gear K, which is mounted on a shaft K', journaled in bearings $k$ on the under side of the beams A' $A^2$. The gear K also intermeshes with the gear J and with a pinion L, rigidly secured to a transverse shaft L', which, in this instance is journaled beneath the frame A in the brackets $C^3$ a short distance back of the shaft K'. The shaft L' is further provided with a second gear-pinion $L^2$, which is rigidly secured to the shaft adjacent to the pinion L and is of less diameter than the latter.

M and M' designate two spur-gears, which are rigidly secured to a common sleeve $M^2$, in this instance by being cast integral therewith and with each other. The sleeve $M^2$ is mounted to slide on a transverse shaft $M^3$, and is held from rotation thereon by a feather or key $m$ or equivalent means. Said gears M M' are made of suitable diameters to intermesh with the pinions L and $L^2$, respectively, of the shaft L', and are spaced so far apart on the sleeve $M^3$ that when one of the gears is in engagement with its pinion the other gear is out of mesh, and vice versa. The endwise movement of the sleeve and gears necessary to throw the latter alternately into mesh with their respective pinions is in this instance accomplished by means of a lever N, pivoted between its ends to a cross-bar $A^8$ of the frame A and forked at its front end to engage an annular groove $m'$, formed at the end of the sleeve $M^2$. The rear end of the lever N extends through an elongated bracket O on the under side of the rear cross-bar $A^4$ of the frame A, and is held at either end of the bracket, as desired, by means of pins or lugs $o$. The latter project upward from the bracket far enough to normally prevent the lever from moving, but terminate at a distance from the under surface of the bar $A^4$ greater than the thickness of the lever, so that the latter may be lifted above the pins $o$ and moved from one side to the other to throw either of the gears M or M' into operation, as desired. Obviously as thus constructed the pinions L $L^2$ and gears M M' and adjacent parts constitute a positively-acting speed-changing gear, by means of which the shaft $M^3$ will be rotated at a greater or less speed, accordingly as the lever N is shifted to bring the gear M into mesh with the pinion L or the gear M' into mesh with the pinion $L^2$.

The shaft $M^3$ is journaled in bearings $m^2$, bolted to the under surface of the side beams A' $A^2$, and projects at one end beyond the beam A' to support a rigidly-attached pinion M⁴. Said pinion intermeshes with a large gear B³, loosely mounted on the shaft B² and serving to drive the latter and the driving-wheels B B' by means of a common form of differential gearing B⁴. As herein shown, this differential gearing comprises a bevel-gear $b$, rigidly attached to the shaft B², a second bevel-gear $b'$, rigidly attached to the driving-wheel B, adjacent to the gear B³, and two diametrically-opposite bevel-pinions $b^2$, journaled radially within said gear B³ and intermeshing at once with both the bevel-gears $b$ and $b'$. The driving-wheel B' in this construction is rigidly attached to the shaft B², while the wheel B is mounted to rotate freely thereon. The differential gearing thus formed acts in a well-known manner to normally drive each of the wheels B B' with equal force, while permitting either wheel to travel at a different rate of speed than the other when rounding curves, &c. Obviously, with the construction described, when the upper friction-pulley E is forced into contact with the motor-pulley D⁴ to revolve therewith it will operate through its shaft E' and pinion E³ and through the gear J to revolve the gear K in one direction, while when the lower friction-pulley F is forced into contact with the motor-pulley D⁴ it will operate through the shaft F' and pinion F³ to revolve said gear K in an opposite direction. From the gear K the motion is transmitted through the speed-changing gear described to the shaft M³, and from the latter through the pinion M⁴, gear B⁵, and differential gearing B⁴ to the drive-wheels B B'. As herein shown, the pinions E³ and F³ are made of equal size, so that the velocity of the vehicle is the same when running forward as when running backward, although the rate of speed in either direction may be varied, as desired, by shifting the lever N.

For enabling the motor to be used for furnishing power while the vehicle remains stationary the gear J is herein shown as mounted to slide endwise on a feather $j'$ on the shaft J', so that it may be thrown out of mesh with the pinion E³. Set-screws $j^2$ in the hub of the gear permit the latter to be thus shifted and secured in the desired positions. The shaft F' is, moreover, provided at its end with a belt-pulley F⁴, from which a driving-belt may be led off, as desired. When it is desired to drive the belt from the pulley F⁴, the gear J is moved along on its shaft J' in the manner stated until it is free from the pinion F³, whereupon the friction-pulley F may be forced into contact with the motor-pulley D⁴ and will rotate the belt-pulley F⁴ without affecting the propelling-gear. As herein shown, the periphery of the motor-pulley D⁴ is provided with a covering $d'$, of leather or other suitable material, which increases the efficiency of the frictional engagement between said pulley and the pulleys E and F. Obviously, however, the covering may, if desired, be applied to said pulleys E and F instead of the pulley D⁴ or to all the pulleys.

The base-plate A⁷, upon which the motor is bolted, is adjustably secured upon the frame A between adjusting-screws A⁹, which are mounted in brackets $a^6$, bolted to the lower beams A' A², and engage the opposite ends of the plate A⁷ at the corners thereof. By adjusting the screws A⁹ the motor may be moved upon the frame A so as to adjust its wheel D⁴, as desired, with relation to the pulleys E and F. A considerable pressure is necessarily required to be exerted on the journals of the shafts E' and F' adjacent to the pulleys E and F, in order to properly maintain the frictional engagement between said pulleys and the motor-pulley D⁴. Therefore to reduce the frictional resistance of the bearings $g$, within which said shafts are journaled at this end, said bearings are provided with anti-friction-rollers $g'$ $g'$, which are journaled within recesses G² in the front face of the arm G near the ends thereof. The shafts E' and F' rest between said rollers on the front side thereof and are held in place by caps $g^3$, which cover the recesses $g^2$. With this construction the pressure required to hold the pulleys E and F against the motor-pulley D⁴ will obviously be exerted through the medium of the rollers $g'$ $g'$, and the resulting friction of the bearings will be very slight.

In connection with the gas or vapor motor shown a tank D⁶, adapted to contain water for cooling the jacket of the cylinder D', is mounted above said cylinder upon standards $d^3$ and is connected with the cylinder-pipes $d^4$ $d^4$. To prevent the necessarily limited water-supply contained in the tank D⁶ from becoming too highly heated for effective service, I propose as a further improvement to continuously discharge air into said tank through a pipe $p$ leading from a blower P, driven by a motor. As herein shown, the blower P is placed on a transverse board or plate A¹⁰ at the front of the frame A, and is operatively connected with the shaft E' by means of a belt $p'$ running over the blower-pulley P' and a pulley F⁵ on said shaft. The nozzle $p^2$ of the pipe $p$ is perforated or provided with a large number of small apertures and serves to discharge air-jets in different directions through the tank, thereby cooling the water therein either by the contact with the water of the air or by the increased evaporation produced by the passage of the air through the water, or both. Although illustrated in this instance as applied to a traction-engine, it will be obvious that mechanism embodying my present improvements in whole or in part may be employed in propelling vessels, as well as land-carriages, or for propelling air-ships, or for any other purpose to which it may be adapted.

Important advantages are gained by the construction in which two friction-pulleys are arranged in proximity to the driving-pulley and are movable toward and from the driving-pulley, so that either may be thrown into contact therewith, in connection with spur-gearing which separately connects each of the friction-pulleys with the part to be driven, and is adapted to transmit motion in opposite directions to the said part to be driven, whereby the direction of motion of the driven part may be changed at will, as follows: A spur-gear-reversing device has heretofore been used on traction-engines for the purpose of changing the direction of motion thereof; but it is obviously impracticable to shift the spur-gearing, so as to throw the gear-wheels thereof into mesh with each other without stopping the motion of the engine or motor and bringing the gearing to a state of rest, or nearly so. Such a construction therefore is entirely impracticable with road-wagons, in which it is often necessary to reverse the direction of motion with the utmost possible quickness, and where, for economy of operation and other reasons, the prime mover must remain continuously in operation. For similar reasons, in the case of a driving-gear used for hoisting machinery or the like, where a continuously-running motor is employed, it is necessary that the prime mover should continue in operation, and the direction of motion in the driving part changes as desired without the necessity of stopping the prime mover. The fact that a spur-gear-reversing apparatus cannot be used in connection with a continuously-operating motor will be obvious from the fact that the sudden engagement of one spur-gear wheel with another rapidly-revolving one would result in the breakage of the teeth and damage to the parts, even though the gearing was not accomplishing any work, such as driving a vehicle.

Other advantages arising from the use of a friction-reversing gear of the kind described is that by the yielding or slipping of the friction-surfaces to a greater or less extent, depending on the pressure or force used to bring them together, the driving parts may be stopped and reversed without jar and in a greater or less period of time, according to the judgment of the operator; or, in other words, by the use of the friction-gears described the stopping, starting, and reversal of the vehicle is entirely under the control of the operator. Furthermore, the employment, as herein proposed, in connection with a friction-reversing device of the character described, of a speed-changing device consisting of spur-gears located between the friction-reversing device and the driving-wheels or other part to be driven has the important advantage of providing a simple, strong, cheap, and efficient construction in the parts, while at the same time avoiding the objection heretofore attaching to the use of such spur-gear speed-changing device—viz., that the motor or prime mover must be stopped in order to enable the speed to be changed, it being clear that the speed-changing device, when located in the gearing between the friction-reversing device and the part to be driven, as described, can be brought to a state of rest without stopping the motor by properly manipulating the friction-reversing device.

An important part of my invention is embraced in the construction by which the gearing which connects one of the friction-pulleys, as the pulley E, with the driving-wheels or other part to be driven is provided with a gear-wheel, as gear-wheel J, in excess of the gear-wheels constituting the gearing between the other driving-pulleys, as F, and the part to be driven, said additional gear-wheel constituting a reversing gear-wheel, by the presence of which the two friction-pulleys turn the driven parts in opposite directions. As, for instance, assuming the shaft K to be the driven part, this shaft is driven from the pulley F by means of the pinion $F^3$ and the gear-wheel K, but said shaft is driven from the other pulley E through the medium of the pinion $E^3$, the gear-wheel J, (which constitutes the reversing gear-wheel,) and the said gear-wheel K. By reason of the obvious advantages in point of simplicity and cheapness of construction and certainty and smoothness of operation obtained by this construction the same is herein claimed as an important part of my invention.

I claim as my invention—

1. The combination, with a prime mover and a part to be driven, of driving connections between the same, comprising a driving pulley actuated by the prime mover, two friction pulleys arranged in proximity to the driving pulley, said pulleys being movable toward and from the driving pulley, a spur gearing connecting both of said pulleys with the part to be driven, said spur gearing being constantly engaged with both friction pulleys and embracing a gear wheel intermeshing with another gear wheel which is engaged with one of the friction pulleys, said gear wheel first mentioned being engaged with the other friction pulley and acting to reverse the direction of motion of the second gear wheel when driven by such other pulley, substantially as described.

2. The combination, with a prime mover and a part to be driven, of driving connections between the same, comprising a driving pulley, two bodily movable friction pulleys arranged in proximity to the driving pulley, gearing connecting both friction pulleys with the part to be driven, embracing a gear wheel which is actuated by one of the pulleys, and which gives reverse movement to the gearing when the latter is driven by the pulley, and a spur gear, speed changing device interposed between said spur gearing and the part to be driven, substantially as described.

3. The combination, with a prime mover and a part to be driven, of driving connections between the same, comprising a driving pulley which is actuated by the prime mover, two friction pulleys arranged in proximity to the driving pulley, spur gearing connecting both friction pulleys with the part to be driven, said spur gearing embracing a gear wheel which is driven by one friction pulley, and a second spur wheel which intermeshes with the first spur wheel and is driven by the second friction pulley, and a spur gear, speed changing device interposed between the first spur gear mentioned and the part to be driven, substantially as described.

4. The combination, with a prime mover and a part to be driven, of driving connections between the same, embracing a driving pulley, two friction pulleys adapted for contact with the same, an oscillating arm carrying said friction pulleys, a gear wheel between one of the friction pulleys and the part to be driven by which the latter is turned in opposite directions by the two friction pulleys, and means connected with said oscillating arm for shifting the friction pulleys toward or from the driving pulley, substantially as described.

5. The combination, with a prime mover and a part to be driven, of driving connections between the same, comprising a driving pulley, two friction pulleys adapted for contact with the driving pulley, two shafts for said friction pulleys which are journaled in bearings permitting a slight oscillatory movement in the shafts, an oscillatory arm in which said shafts are supported at one end, gearing connecting said shafts with the part to be driven, embracing a spur gear which is actuated by one of the shafts, and a second spur gear intermeshing with the first spur gear and driven by the other shaft, and means for giving oscillatory movement to said arm, substantially as described.

6. The combination, with a driving pulley, two friction pulleys arranged adjacent to the driving pulley, driving shafts supporting said friction pulleys, a pivoted arm supporting the ends of said shafts adjacent to the pulleys, bearings for the shafts in said oscillatory arm comprising anti-friction rollers mounted in the oscillatory arm and bearing on the shafts at the sides thereof opposite the driving pulley, and caps attached to the arm and confining the shafts in contact with said anti-friction rollers, substantially as described.

7. A traction engine, comprising a prime mover, driving wheels, and driving connections between said prime mover and the driving wheels, comprising a driving pulley which is actuated by the prime mover, two bodily movable friction pulleys arranged in proximity to the driving pulley, means for shifting or moving said pulleys to bring either of the same into contact with the driving pulley, gearing connecting both friction pulleys with the driving wheels, the gearing which connects one friction pulley with the driving wheels embracing a spur wheel in excess of those embraced in the gearing which connects the other friction pulley with the driving wheels, whereby said driving wheels will be turned backwardly by one pulley and forwardly by the other pulley, and a speed changing device interposed between the said friction pulleys and the driving wheels, substantially as described.

8. A traction engine, comprising a prime mover, driving wheels, and driving connections between said prime mover and the driving wheels, embracing a friction reversing gear having a driving pulley driven by the prime mover, two friction pulleys, gearing connecting said friction pulleys with the driving wheels, embracing a reversing gear wheel between one of the pulleys and the driving wheels, and a spur gear, speed changing device interposed between the gears which are immediately driven by the friction pulleys and the driving wheels, substantially as described.

9. A traction engine comprising a frame provided with driving and supporting wheels, a motor mounted on said frame and having a driving pulley, friction pulleys adapted for contact with the driving pulley, shafts carrying said friction pulleys journaled at one end on the vehicle frame in bearings permitting a slight oscillatory motion of said shafts, a pivoted arm in which the opposite ends of said shafts are mounted, intermediate gearing between said shafts and the driving wheels, and means for oscillating the said arm to throw either friction pulley into engagement with the motor pulley, substantially as described.

10. The combination, with a prime mover, of driving connections between said prime mover and a part to be driven, comprising a driving pulley actuated by the prime mover, two friction pulleys either of which may be brought into contact with the driving pulley, a gear wheel intermeshing with a pinion on the shaft of one of the friction pulleys, a second gear wheel intermeshing with said gear wheel first mentioned and also with a pinion on the shaft of the second friction pulley, and a speed changing mechanism comprising a shaft which is driven by the gear wheel first mentioned, large and small pinions rigidly attached to said shaft, a second shaft provided with small and large gear wheels and having driving connection with the part to be driven, said large and small gears on one of the shafts being adapted for endwise movement thereon, substantially as described.

11. A traction engine, comprising a frame provided with driving wheels, a motor mounted on said frame, and gearing between said motor and driving wheels comprising a driving pulley actuated by the motor, two friction pulleys which are movable toward and from the driving pulley, a gear wheel which intermeshes with a pinion on the shaft of one of the friction pulleys, a second gear wheel which intermeshes with the first mentioned gear wheel and with a pinion on the shaft of the other driving pulley, a shaft having operative connection with the first named gear wheel, a second shaft parallel to the same and having driving connection with the driving wheels of the vehicle, and a change speed gearing comprising large and small pinions on both of said shafts, those on one of the shafts being movable endwise thereon, substantially as described.

12. The combination with a prime mover, of a driving pulley actuated by the prime mover, a frame supporting the prime mover and the driving pulley, friction pulleys arranged with their peripheries in proximity to the driving pulley, and gearing connecting both of said pulleys with the part to be driven, the said frame which carries the prime mover and the driving pulley being adjustably supported on its base whereby the driving pulley may be moved toward and from the friction pulleys, substantially as described.

13. The combination with a main frame carrying a revolving part to be driven, of a motor mounted on said frame comprising a power cylinder or other prime mover and a driving pulley which is actuated by the same, friction pulleys which are mounted on the main frame and which are movable toward and from the driving pulley, and gearing on the main frame connecting both of said pulleys with the part to be driven, the said motor frame having sliding connection with the main frame whereby the driving pulley thereon may be adjusted relatively to the said friction pulleys, substantially as described.

14. In a traction engine, the combination with a main frame provided with driving wheels, of a motor mounted on said frame provided with a driving pulley, friction pulleys adapted for contact with the driving pulley, an oscillatory arm mounted on the main frame and supporting said friction pulleys, gearing connecting said friction pulleys with the driving wheels, means for oscillating said arm to throw either friction pulley into engagement with the motor pulley, and means for adjusting the motor pulley with relation to the friction pulley comprising adjusting screws acting on the base of the motor frame to shift the same on the main frame, substantially as described.

In testimony that I claim the foregoing as my invention I affix my signature in presence of two witnesses.

GEORGE W. LEWIS.

Witnesses:
C. CLARENCE POOLE,
WM. L. HALL.